United States Patent [19]

Baba et al.

[11] Patent Number: 4,931,340
[45] Date of Patent: Jun. 5, 1990

[54] HONEYCOMB PANEL STRUCTURE

[75] Inventors: Takeaki Baba, Chofu; Keizo Nanba, Nagoya; Yoshio Takeshima, Ueno; Hiromichi Sano, Chiryu; Koji Tobita, Hiroshima; Atsuo Muneto, Hiroshima; Toshihiro Hara, Hiroshima; Kazuki Fujise, Hiroshima, all of Japan

[73] Assignee: Sumitomo Light Metal Industries, Ltd., Tokyo, Japan

[21] Appl. No.: 944,869

[22] Filed: Dec. 22, 1986

[30] Foreign Application Priority Data

Dec. 28, 1985 [JP] Japan ............................ 60-204174[U]

[51] Int. Cl.$^5$ ............................................. B32B 3/12
[52] U.S. Cl. ...................................... 428/73; 52/806; 52/823; 108/51.1; 428/116; 428/192
[58] Field of Search ................ 428/116, 117, 73, 118, 428/192; 52/823, 806; 108/51.1, 51.3.901; 280/781, 785

[56] References Cited

U.S. PATENT DOCUMENTS

| | | | |
|---|---|---|---|
| 2,126,278 | 8/1938 | Quayle | 108/51.1 |
| 3,476,422 | 11/1969 | Campbell | 428/73 X |
| 3,709,161 | 1/1973 | Kauffman | 108/51.1 |
| 3,769,767 | 11/1973 | Scott | 428/73 X |
| 3,814,655 | 6/1974 | Weill et al. | 52/823 X |
| 3,998,024 | 12/1976 | Frandsen | 428/73 X |
| 4,020,207 | 4/1977 | Alfter et al. | 428/116 X |

Primary Examiner—Henry F. Epstein
Attorney, Agent, or Firm—Parkhurst, Oliff & Berridge

[57] ABSTRACT

A honeycomb panel structure for thermal and acoustic insulation and for load bearing capability has a honeycomb panel which comprises a honeycomb core laminated with two facing plates, and a pair of housings. Each housing has a channel to engage and support a edge of the honeycomb panel. A first neutral axis passes through the center of gravity of the honeycomb panel and extends in the direction of the panel. A second neutral axis passes through the centers of gravity of the housings and extends parallel to the first neutral axis. The first and second neutral axes are spaced apart in a vertical direction so that the structure has much higher flexural rigidity.

7 Claims, 11 Drawing Sheets

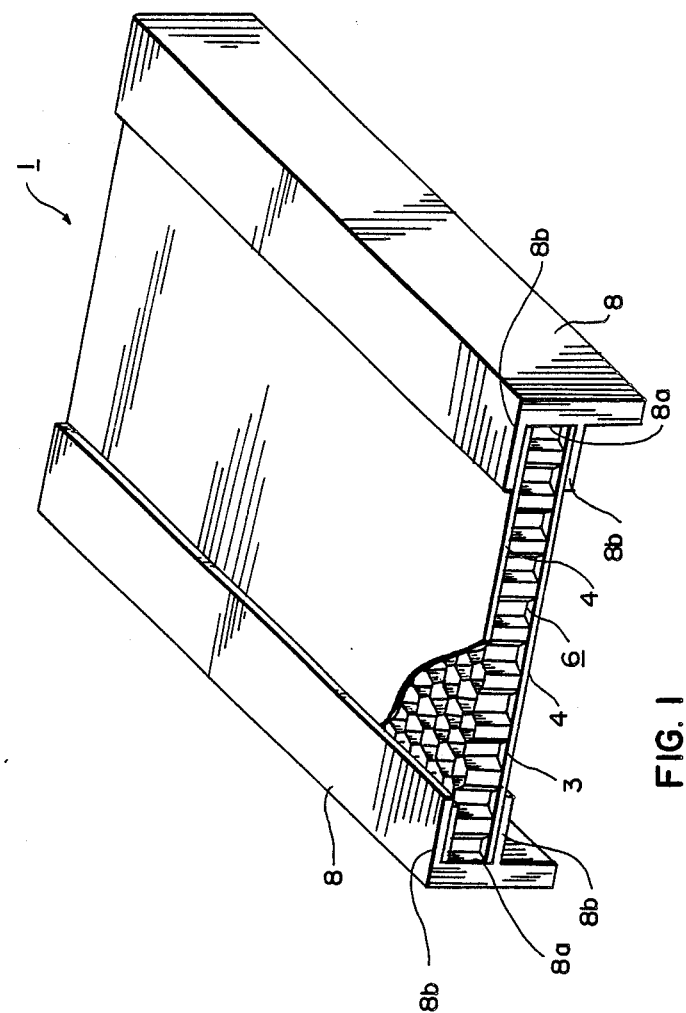

HONEYCOMB PANEL STRUCTURE

BACKGROUND OF THE INVENTION

1. Field of the Invention

The present invention relates to a honeycomb panel structure in which the panel is supported by housings.

2. Prior Art

Honeycomb panels which have acoustic, thermal, and energy insulating characteristics have been utilized in variable fields, for example, transportation and architecture, in recent years.

FIGS. 13A and 13B show prior art housing materials or honeycomb panel structures. In FIG. 13A, a honeycomb panel structure 50 is formed by connecting two facing plates 53 with the upper and lower surfaces of a honeycomb core 52, and engaging a housing 55 having a U-section with an edge 52a of the core 52 and with the plates 53 as shown. Also, in FIG. 13B, another honeycomb panel structure 60 comprises a honeycomb core 62 and two facing plates 63 attached to the upper and lower surfaces thereof, and an angular pipe 65 engaged with a channel made of the two plates 63 and an edge 62a of the core 62.

In the prior art, the housing 55 having a U-section and the angular pipe 65 cover the edge of the honeycomb core flatly, but do not appreciably strengthen the rigidity of the honeycomb core. Therefore the above-mentioned panel structures are unsuited for uses requiring high rigidity.

SUMMARY OF THE INVENTION

It is an object of the present invention to provide a honeycomb panel structure which has high specific rigidity by using a reinforcing housing of simple construction.

Another object of the present invention is to provide a honeycomb panel structure which is applied to an automobile.

The honeycomb panel structure includes two housings fitted to opposite sides of a honeycomb panel.

The honeycomb panel comprises a honeycomb core shaped like a board and facing plates covering the upper and lower surfaces thereof. The panel may comprise side facings connected with the side surfaces of the core, and further supporting members attached to the edges of the core.

Each housing has parallel projections on a side thereof, that is, an engagement channel. The engagement channel engages the edge of the honeycomb panel.

Further, in the structure of the present invention, a first neutral axis passes through the center of gravity of the honeycomb panel, and extends in the direction of the panel. A second neutral axis passes through the centers of gravity of the housings and extends in the direction of the panel. The first neutral axis is always to be apart from the second neutral axis with a predetermined distance. The flexural rigidity of the structure is higher than the sum of two rigidities of the housings and the honeycomb panel.

In the case that the panel structure is applied to a vehicle, the housing is utilized as a frame of a vehicle, and the honeycomb panel as a floor member.

In the case where the honeycomb panel is utilized as a floor member of a vehicle or larger structures, a plurality of the panels which are different in depth may be engaged with a pair of housings having channels of suitable sizes for the panels, thereby obtaining much higher rigidity.

Materials for a honeycomb core, a facing plate, and side plate, are metals like aluminum or iron, paper material like cardboard, resin impregnated paper or synthetic paper, plastic sheet like polyethylene, polyplopylene, and fiber reinforcements thereof, etc.

BRIEF DESCRIPTION OF THE DRAWINGS

The above and other objects, features and advantages of the invention will become apparent from the following detailed description of the invention when taken in conjunction with the accompanying drawings, in which:

FIG. 1 is a perspective view of a honeycomb panel structure according to an embodiment of the present invention;

DETAILED DESCRIPTION OF THE PREFERRED EMBODIMENT

Figure 2A:
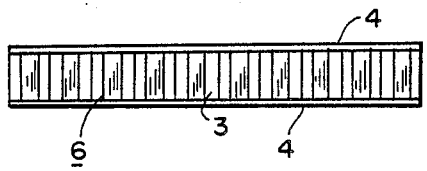
FIGS. 2A, 2B and 2C are an explanatory view illustrating the assembly of the embodiment of FIG. 1.

An embodiment of the present invention is described referring to the drawings hereinafter.

Figure 2B:
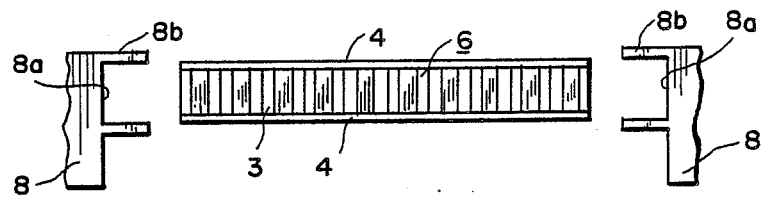
Figure 2C:
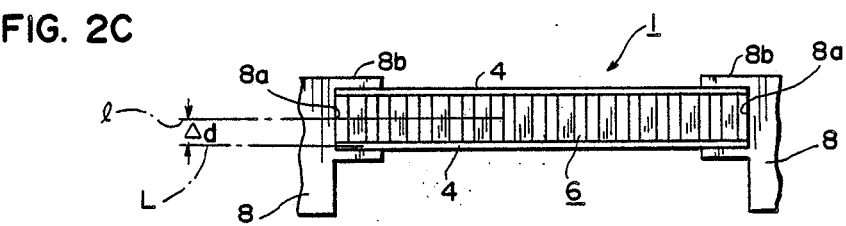

FIG. 1 is a perspective view of a honeycomb panel structure. The honeycomb panel structure 1 is manufactured as follows. Initially, a honeycomb panel 6 is formed by affixing facing plates 4 to the upper and lower surfaces of a honeycomb core 3 with an adhesive agent. Engagement channels 8a are formed between parallel projections 8b on the sides of housings 8. As shown in FIGS. 2A–2C, a honeycomb panel structure 1 is assembled by engaging opposite edges of the honeycomb panel 6 with the engagement channels 8a of the housings 8.

In the above composition, the edges of the honeycomb panel 6 are engaged with the engagement channels 8a between the parallel projections 8b on the sides of the housings 8. The honeycomb core 3 and facing plates 4 are firmly held between the projections 8b.

Referring to FIG. 2C, a first neutral axis 1 passes through the center of gravity of the honeycomb panel 6 and extends in the direction of the panel 6. A second neutral axis L passes through the centers of the housings 8 and extends parallel to the first neutral axis 1. The neutral axes 1 and L always have a separation dimension Δd, as measured in a vertical direction. In this manner, it is possible to increase the flexural rigidity of the honeycomb panel structure 1.

Figure 3:
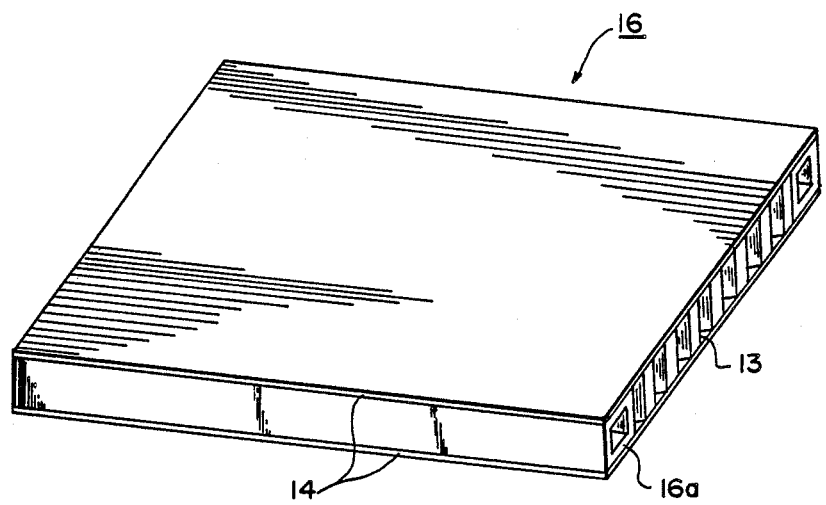
FIG. 3 is a perspective view showing a honeycomb panel used to construct a test embodiment of the honeycomb panel structure of the present invention.

In order to confirm the above-mentioned effect, a comparative loading test of the structure of the present invention was executed as follows. First, as shown in FIG. 3, a conventional honeycomb panel 16 was formed by engaging angular pipes 16a with opposite edges of the honeycomb core, and fitting the facing plates 14 to the upper and lower surfaces of the honeycomb core 13. The members' sizes of two samples, No. 1, No. 2, are as shown in the following Table 1.

$(0.05 \times 10^5$ kg.m$^2)$. This result proves that, when the neutral axes of the honeycomb panel and the housing are separated, the honeycomb panel structure has much higher flexural rigidity.

Figure 6:
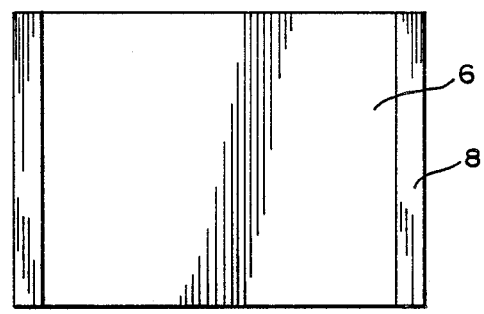
FIGS. 6 and 7 are plane views of honeycomb panel structures.
Figure 7:
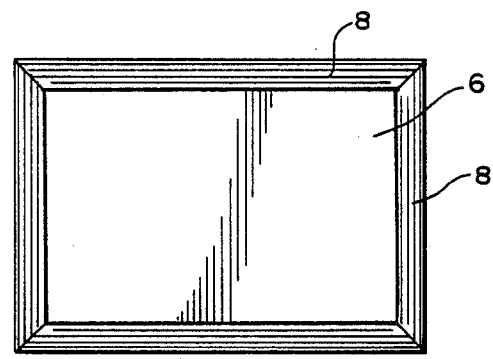

The housings 8, which are engaged with opposite edges of the honeycomb panel 6 in FIG. 6, may be engaged with all four sides of the panel 6 as shown in FIG. 7.

Figure 8:
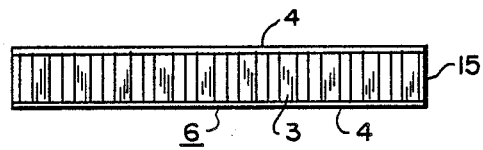
FIG. 8 is a side view of a honeycomb panel.

Also, as shown in FIG. 8, the honeycomb panel 6 may consist of a honeycomb core 3 which is covered completely. Namely, in addition to the facing plates 4 which are fixed to the upper and lower surfaces, side plates 15 may be fitted to all four side surfaces of the honeycomb core 3.

Figure 9:
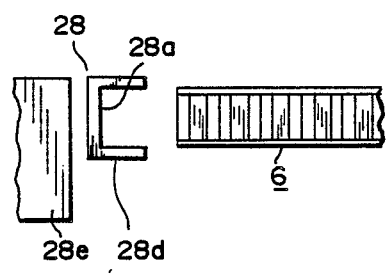
FIG. 9 is an explanatory view of another embodiment of a honeycomb panel structure before assembling.

Moreover, as shown in FIG. 9, the housings of the present invention may be in the form of a housing 28 which consists of a supporting portion 28e to which is connected a frame 28d having a U-section. The housing

TABLE 1

| | HONEYCOMB CORE | | | | FACING PLATE | | SIZE OF | SIZE OF |
|---|---|---|---|---|---|---|---|---|
| SAMPLE | CELL SIZE (inc.) | THICKNESS (μ) | DEPTH (mm) | MATERIAL | THICKNESS (mm) | MATERIAL | ANGULAR PIPE AT EDGE OF CORE | HONEYCOMB PANEL (mm) L × W × T |
| No. 1 | ⅜ | 100 | 30 | A1050-H18 | 1.5 | A1050-H24 | A6063-T5, 20 mm × 30 mm × 2 mmt | 2000 × 1000 × 33 |
| No. 2 | ⅜ | 100 | 70 | A1050-H18 | 1.5 | A1050-H24 | A6063-T5, 45 mm × 70 mm × 2.5 mmt | 2000 × 1000 × 73 |

L: length
W: width
T: thickness

Figure 4:
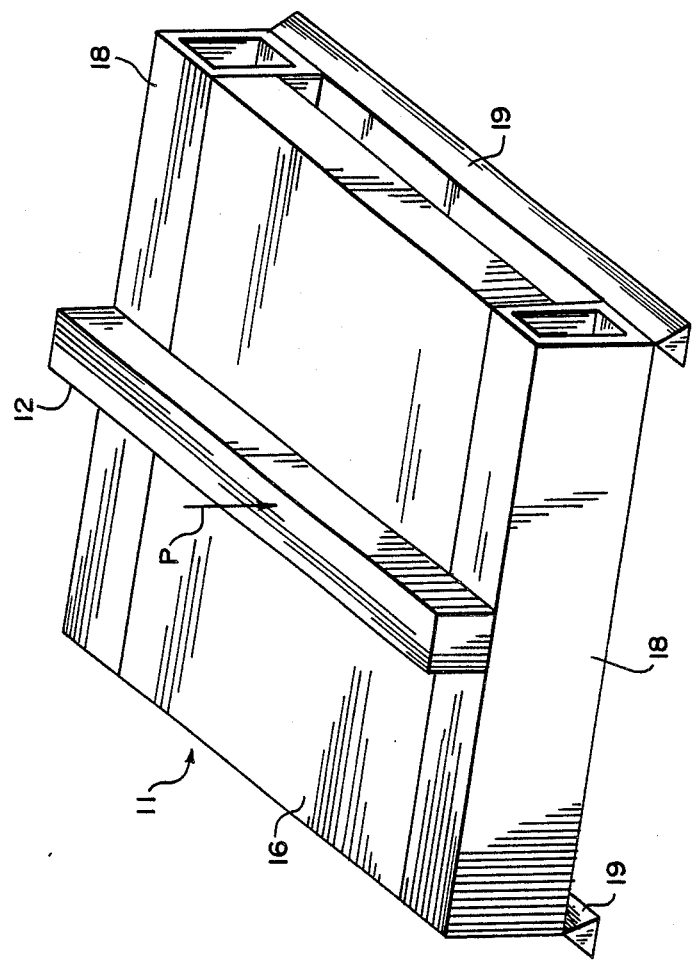
FIGS. 4 and 5 are simplified perspective views of the honeycomb panel structure test apparatus used to test the present invention.
Figure 5:
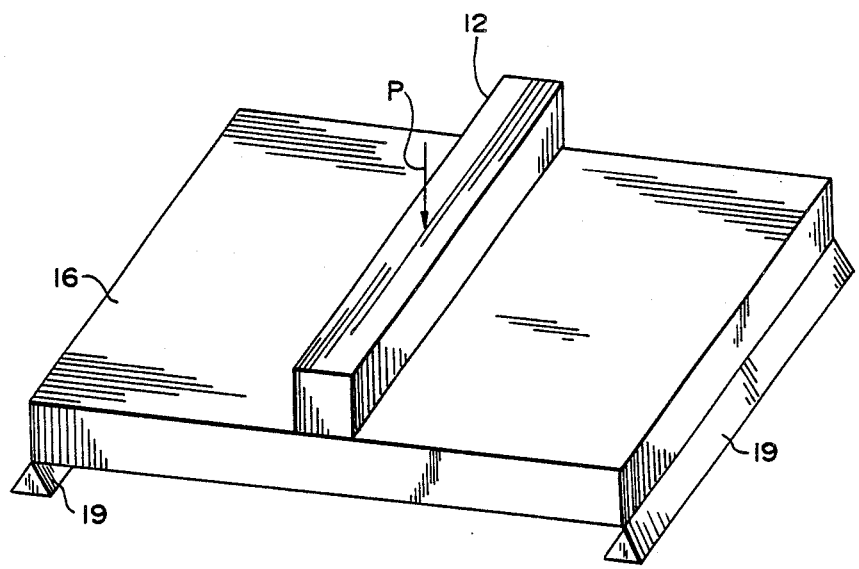

Next, as shown in FIG. 4, a honeycomb panel structure 11 according to the present invention was made which comprised the honeycomb panel 16 shown in FIG. 3 and two housings 18 which are connected to opposite edges of the panel 16. The housings 18 consisted having the dimensions two angular pipes of 150 mm×75 mm×5 mm (JIS A6063-T5), and having flexural rigidity of $0.78 \times 10^5$ kg.m$^2$. Two parallel beams 19 supported opposite edges of the structure. A pushing bar 12 was put on the structure 11 to provide equal loading thereon, and a 100 kg load in the direction of an arrow P was applied to a structure 11. Similarly, the honeycomb panel 16 without housings was tested in a like manner as a reference, as shown in FIG. 5. The measurement results are shown in the following Table 2.

28 is engaged with the honeycomb panel 6 by an engagement channel 28a.

Figure 10:
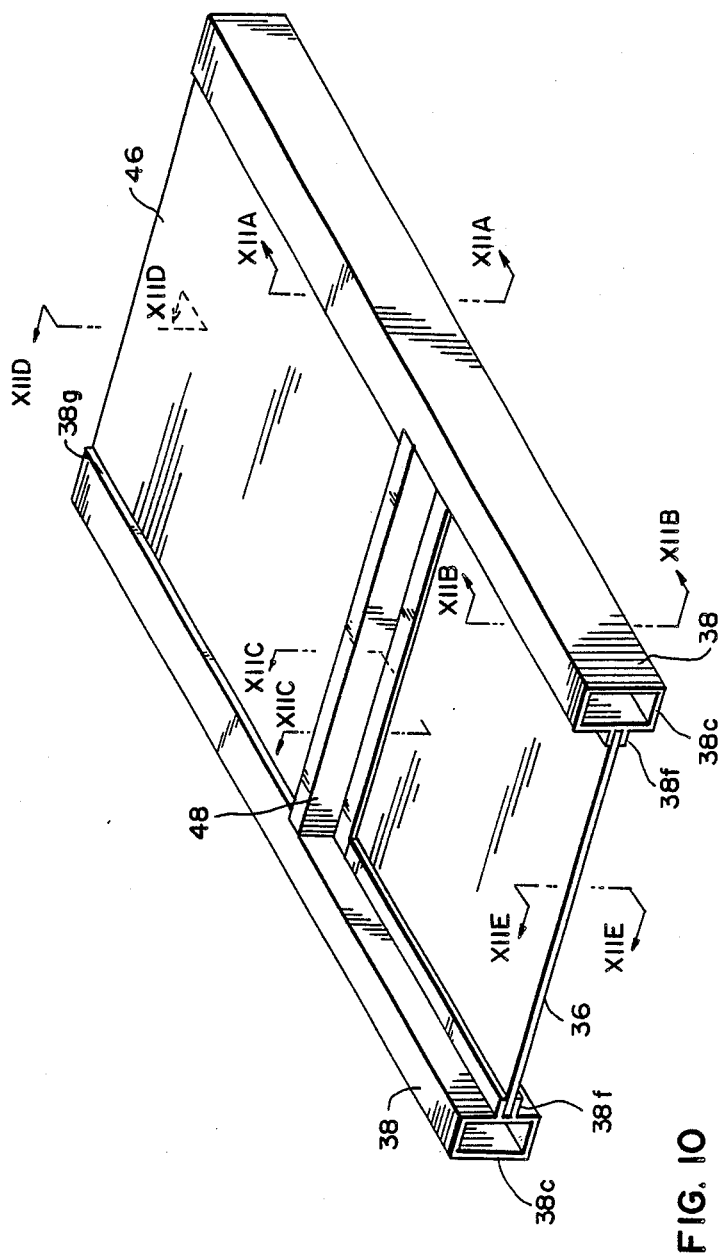
FIG. 10 is a perspective view showing a honeycomb panel structure applied to a vehicle.

FIG. 10 shows a preferred embodiment in which the present invention is applied to the floor of a vehicle. In the embodiment of FIG. 10, a pair of housings 38 are provided along both sides of a vehicle, and another housing installed between the two housings 38. Two panels 36 and 46, of which honeycomb panel 36 is thinner, are supported by the three housings 38 on both sides, and by housing 48.

Figure 11:
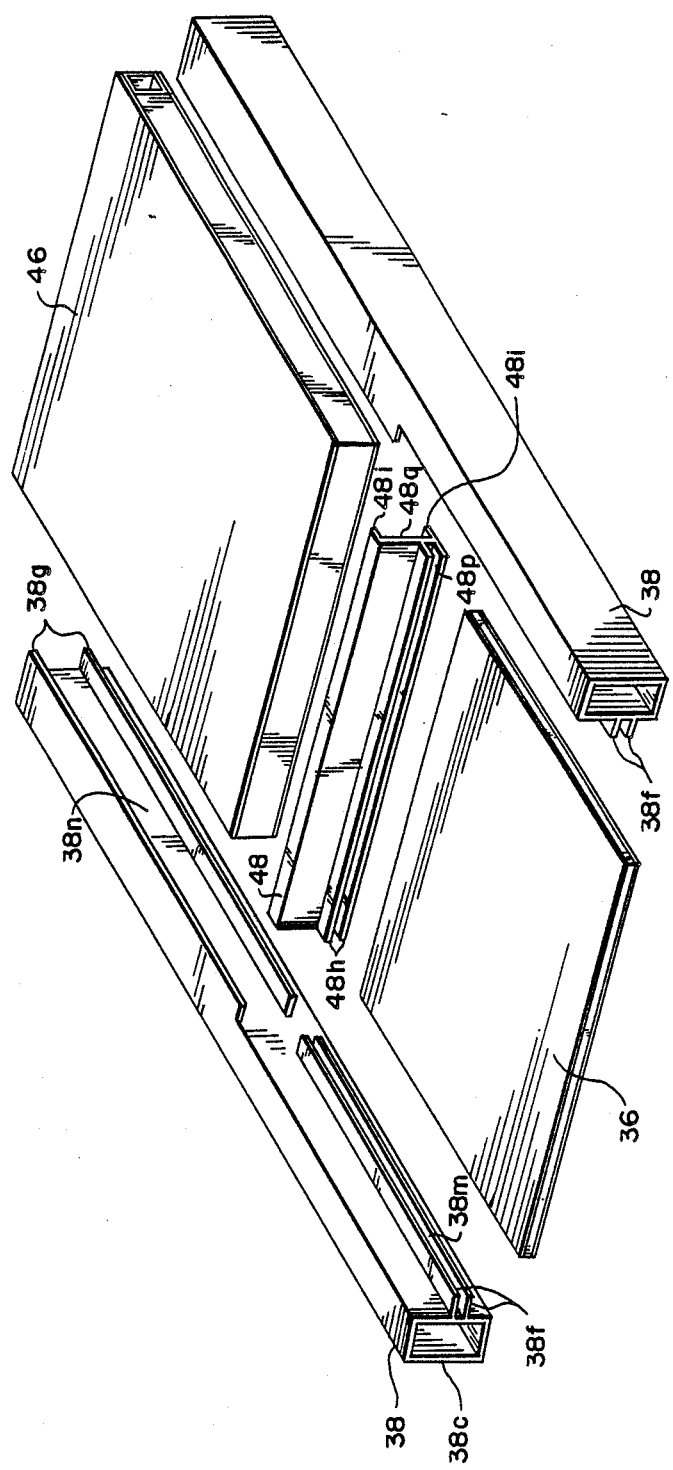
FIG. 11 is an exploded view of the embodiment of FIG. 10.

As shown in FIG. 11, an engagement channel 38m is formed between parallel projections 38f on a side surface of an angular pipe 38c of a housing 38, and another engagement channel 38n is formed between parallel projections 38g and 38g on the same side surface of the pipe 38c. Also, an engagement channel 48p is formed

TABLE 2

| KIND OF HONEYCOMB PANEL | SAMPLE | WEIGHT (kg) | FLEXURAL RIGIDITY G (kg · m$^2$) | SPECIFIC RIGIDITY G/W (kgm$^2$/kg) | EMBODIMENT /REFERENCE RATIO |
|---|---|---|---|---|---|
| No. 1 | REFERENCE | 23 | $0.05 \times 10^5$ | $0.22 \times 10^3$ | $(2.5 \times 10^3)$ |
| | PRESENT EMBODIMENT | 46 | $1.15 \times 10^5$ | $2.5 \times 10^3$ | $/(0.22 \times 10^3)$ = 11 |
| No. 2 | REFERENCE | 31 | $0.3 \times 10^5$ | $0.97 \times 10^3$ | $(2.41 \times 10^3)$ |
| | PRESENT EMBODIMENT | 54 | $1.3 \times 10^5$ | $2.41 \times 10^3$ | $/(0.97 \times 10^3)$ = 2.5 |

In Table 2, the present embodiment/reference ratio is the ratio of the specific rigidity G/W of the present embodiment to that of the reference. In the sample No. 1, the present embodiment has eleven times as high a specific rigidity as does the reference. Also, in the sample No. 2, the present embodiment has 2.5 times as high a specific rigidity as the reference. Further, as shown in the sample No. 1, the present embodiment has higher flexural rigidity than the sum of that of the housing 18 $(0.78 \times 10^5$ kg.m$^2)$ and that of the honeycomb panel between parallel projections 48h and 48h on a side surface of the housing 48, and another engagement channel 48q is formed between parallel projections 48i and 48i on the opposite side surface.

The thinner honeycomb panel 36 is engaged in the engagement channels 38m, 38m, and 48p. The thicker honeycomb panel 46 is engaged in the two engagement channels 38n and channel 48q. These engagements are secured by an adhesive agent or a similar material.

Figure 12C:
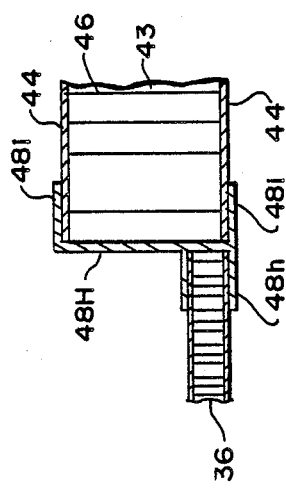
FIG. 12C is a sectional view of the embodiment of FIG. 10 along lines XIIC.
Figure 12D:
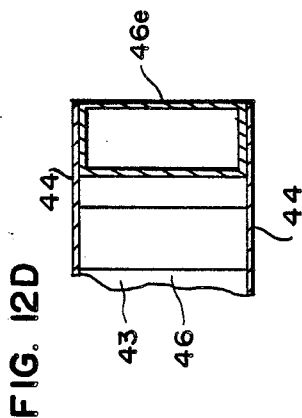
FIG. 12D is a sectional view of the embodiment of FIG. 10 along lines XIID.
Figure 12E:
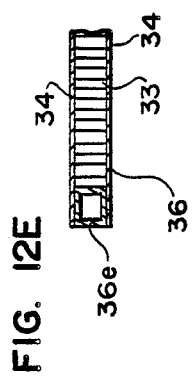
FIG. 12E is an end elevation of the embodiment of FIG. 10 along lines XIIE.
Figure 12A:
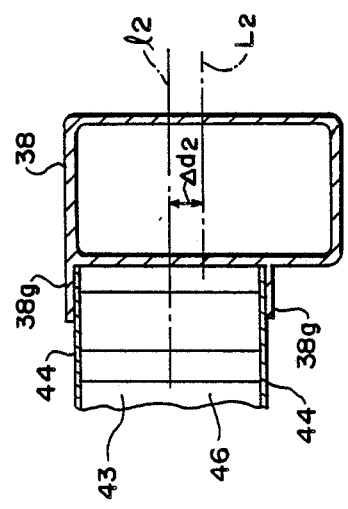
FIG. 12A is a sectional view of the embodiment of FIG. 10 along lines XIIA.

FIGS. 12A is a sectional view of the embodiment of FIG. 10 along line XIIA. The honeycomb core is designated 43, and the facing plates are designated 44. A neutral axis L2 of the housing 38 and the neutral axis 12 of the thicker honeycomb panel 46 are spaced apart in vertical direction by the dimension Δd2.

Figure 12B:
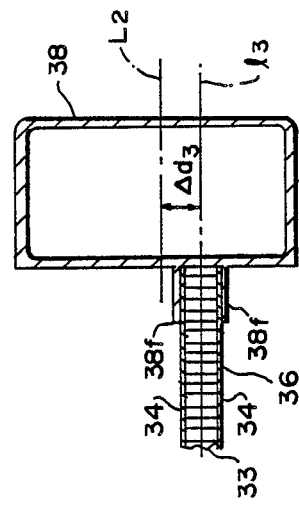
FIG. 12B is a sectional view of the embodiment of FIG. 10 along lines XIIB.
Figure 13A:
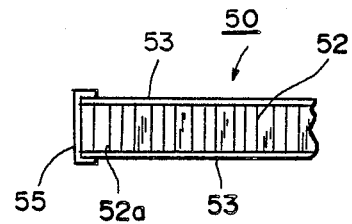
FIGS. 13A and 13B are sectional views of prior honeycomb panel structures.
Figure 13B:
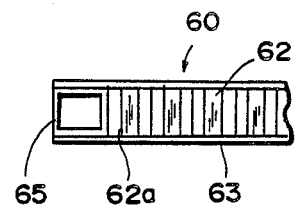

FIG. 12B is a sectional view of the embodiment of FIG. 10 along line XIIB. The honeycomb core is designated 33, and the two facing plates are designated 34. The neutral axis L2 of the housing 38 and the neutral axis 13 of the thinner honeycomb panel 36 are spaced apart in a vertical direction by the dimension Δd3. Accordingly, it is possible to provide honeycomb panel structure having high rigidity as described above.

The floor of a vehicle for through which pass operating the vehicle, such as a brake or an accelerator, employ the thinner honeycomb panel 36 and seats of the vehicle employ the thicker honeycomb panel 46 to obtain a high rigidity.

Furthermore, the housing 48 is installed as shown in FIG. 12C. Also, as shown in FIGS. 12D and 12E, two angular pipes 46e and 36e are provided in the honeycomb panels 46 and 36. The housing 48 and the angular pipes 46e and 36e serve as cross members of the floor. This construction provides improved torsional rigidity of a vehicle.

As described above, according to the present invention, the honeycomb panel structure having a high specific rigidity can be obtained by separating neutral axes of a honeycomb panel and a housing from each other in the direction of load application. Thus the present invention can be applied to various shapes having the above-mentioned condition.

In this disclosure, there is shown and described only the preferred embodiments of the ivention, but it is to be understood that the invention is capable of other and different embodiments in various other combinations and environments, and is capable of changes or modifications within the scope of the inventive concept as expressed herein.

What is claimed is:

1. A honeycomb panel structure comprising:
    a honeycomb panel having a honeycomb core, and two facing plates attached to the upper and lower surfaces, respectively, of said core, said honeycomb panel having a first neutral axis which passes through the center of gravity of, and extends in the longitudinal direction of, said panel; and
    a pair of housings each having a base portion and two parallel projections extending from said base portion which form an engagement channel of substantially uniform cross-section therebetween for engaging said panel without deformation of said core, said base portion for each of said housings extending beyond said projections in a non-parallel direction such that said pair of housings has a second neutral axis which passes through the centers of gravity of said pair of housings parallel to said first neutral axis and spaced from said first neutral axis by a predetermined distance in the direction of loading, thereby providing said panel structure with increased flexural rigidity.

2. The honeycomb panel structure of claim 1 wherein said housing serves as a frame of an automotive vehicle.

3. The honeycomb panel structure of claim 2 wherein said honeycomb panel serves as a floor member of said vehicle.

4. The honeycomb panel structure of claim 1 wherein said engagement channels have varying widths and a plurality of said honeycomb panels having various thicknesses are engaged in said engagement channels.

5. The honeycomb panel structure of claim 1 wherein said housing serves as a frame of a construction.

6. The honeycomb panel structure of claim 5 wherein said honeycomb panel serves as a floor of said construction.

7. The honeycomb panel structure of claim 1 wherein said base portion extends in a substantially perpendicular direction with respect to said projections.

* * * * *